July 2, 1935.  H. T. WHEELER  2,006,377
INCHING PROCESS FOR SHAPING PACKING RINGS
Filed July 18, 1932  4 Sheets-Sheet 1

INVENTOR.
Harley T Wheeler

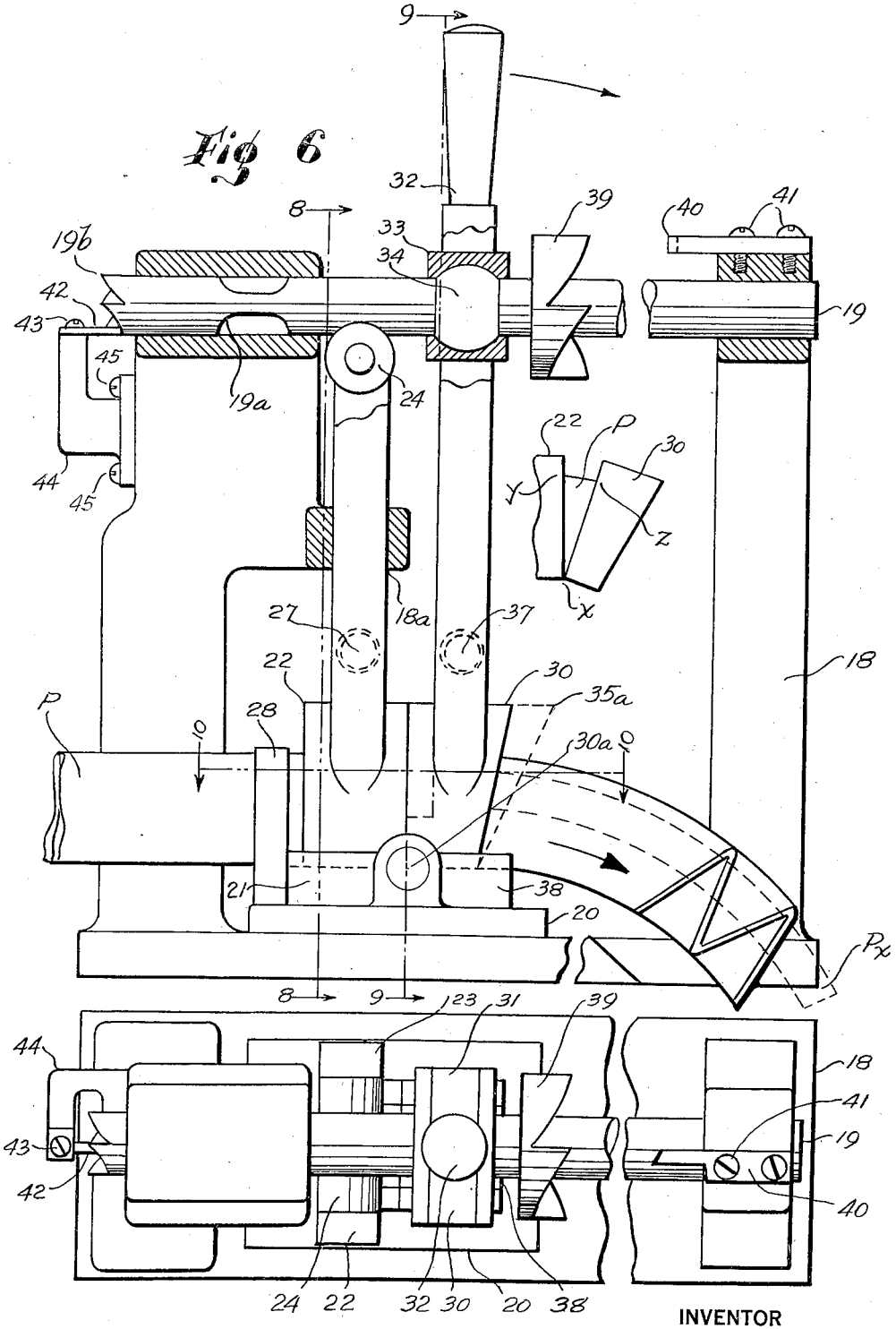

July 2, 1935.  H. T. WHEELER  2,006,377
INCHING PROCESS FOR SHAPING PACKING RINGS
Filed July 18, 1932  4 Sheets-Sheet 3

INVENTOR
Harley T. Wheeler

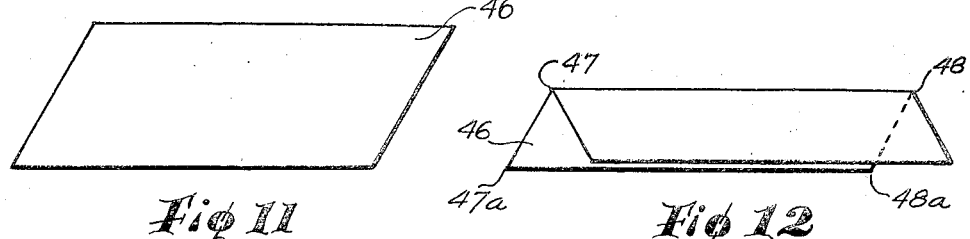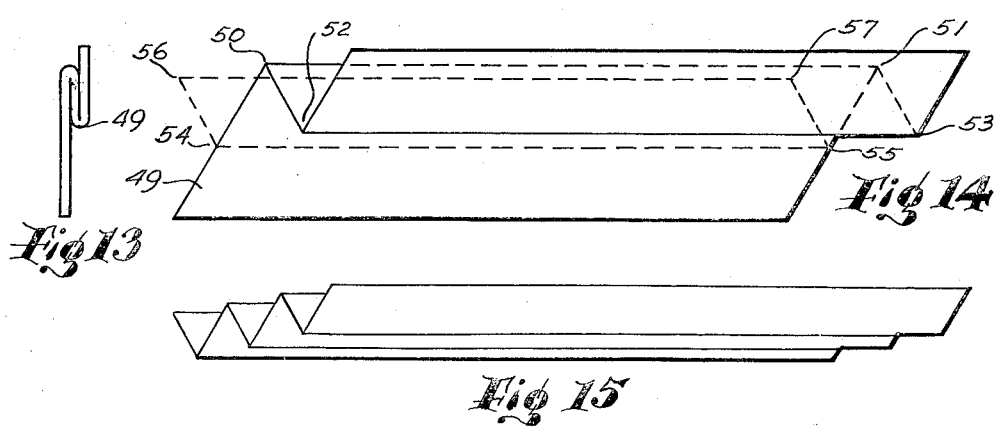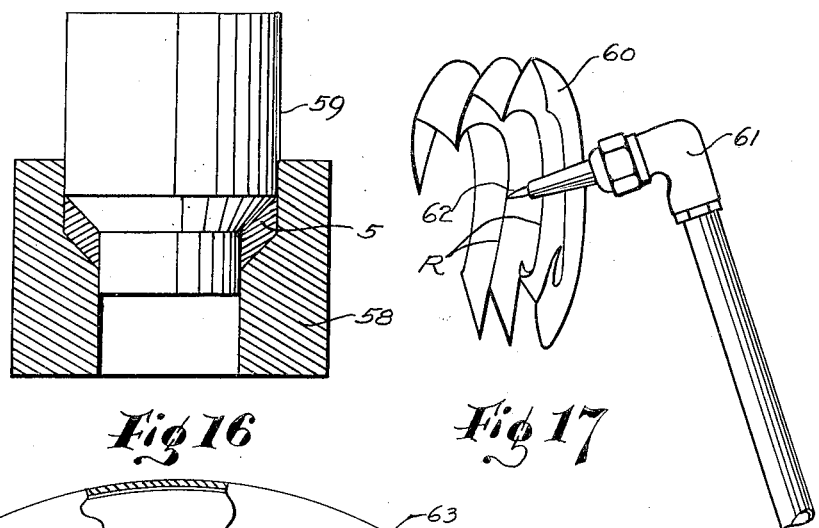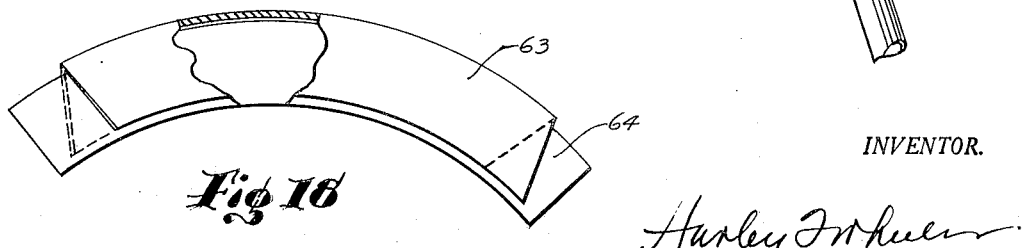

Patented July 2, 1935

2,006,377

UNITED STATES PATENT OFFICE 2,006,377

INCHING PROCESS FOR SHAPING PACKING RINGS

Harley T. Wheeler, Dallas, Tex.

Application July 18, 1932, Serial No. 623,301

11 Claims. (Cl. 154—2)

This invention relates to a process for making packing rings of pleated structure and its chief advantage lies in a capability of making rings very sensitive to changes of pressure, at the same time resisting excessively high pressures and temperatures.

Another advantage is that when the material is once pleated the ring will retain its shape without binders or cements between the laminations thus eliminating the usual hardening of the ring due to chemical combinations which occur in service caused by the use of such binders.

Yet another advantage is that no temporary binders are necessary during the formative process.

One other advantage is that the parallel laminations are always free to act independently one of the other yet are firmly connected by the hinge-like action of the folds.

An additional advantage lies in a method of removing impurities of asbestos after the rings are formed, producing a ring of chemically pure magnesium silicate.

A further advantage is that the ring may be made with an incorporated lap joint which does not lessen the sensitive reaction to pressure, nor permits leakage across the joint.

A still further advantage is that the laminations may be impregnated with a variety of hard-drying chemicals which have a low friction and are impervious to contacting chemicals, without decreasing the flexibility of the ring.

A very important advantage is that in a set of these pleated rings, termed accordion type, that each lamination expands or contracts equally under stress to equalize the pressure drop across each lamination.

With the foregoing advantages and objects in view, further advantages and methods of construction and processing will be disclosed as the description proceeds, accompanied by the drawings, wherein.

Figure 2:
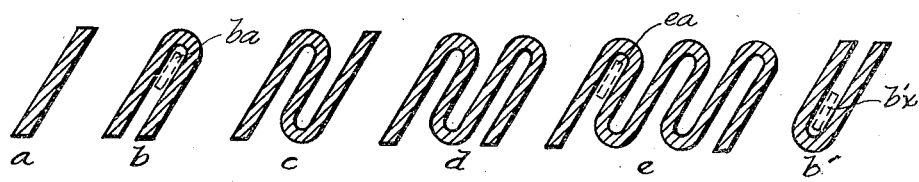
Figure 2 shows the various cross-sections of pleated rings made by the inching process herein described.
Figure 3:
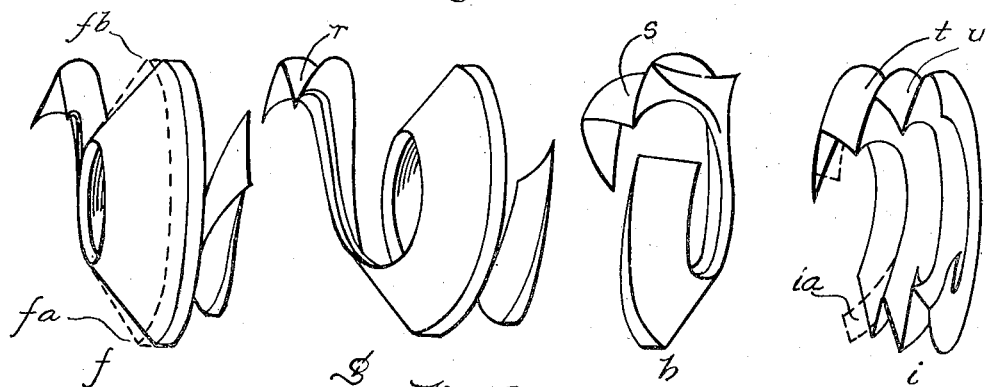

Figure 3 gives perspective views of helically wound and annularly wrapped rings having the cross-sections of Figure 2.

Figure 4:
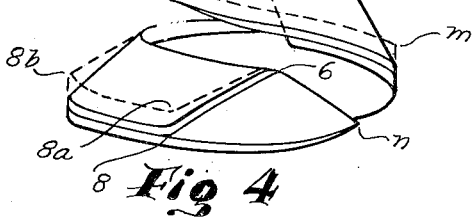

Figure 4 is a perspective of a single plait ring, annular wrap.

Figure 5:
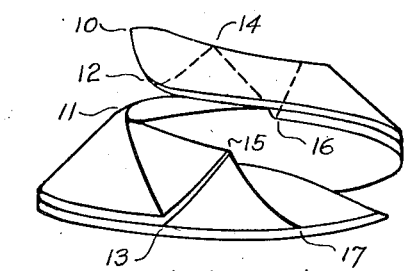

Figure 5 is a perspective of a dually folded ring, annular wrap.

Figure 6 is an elevation of the inching machine.

Figure 7 is a plan view of the inching machine.

Figure 8:
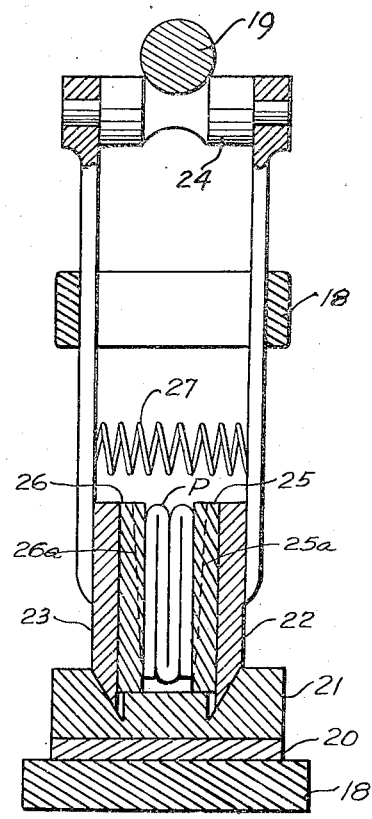

Figure 8 is a cross-section of the holding jaws, on line 8—8 of Figure 6.

Figure 9:
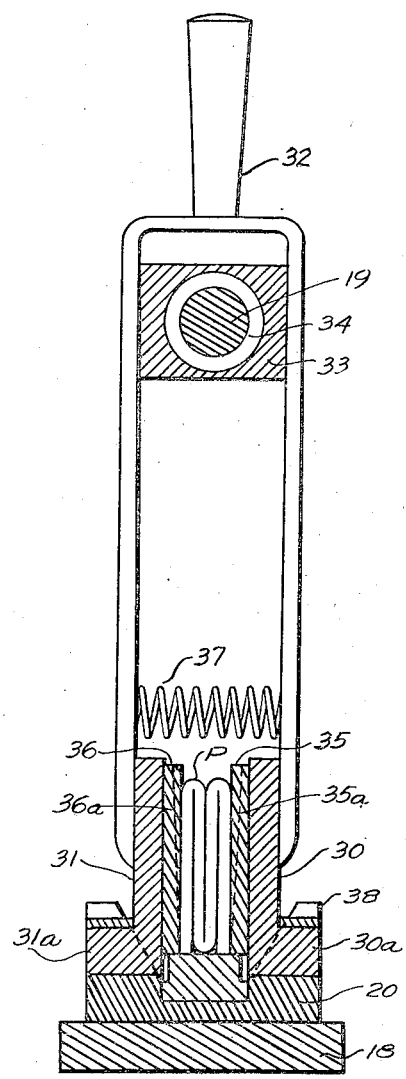

Figure 9 is a cross-section of the rocking jaws, on line 9—9 of Figure 6.

Figure 10:
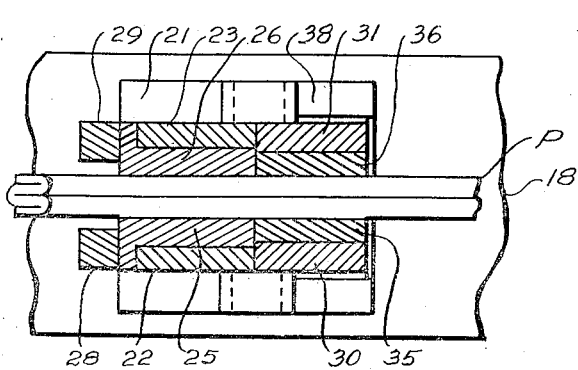

Figure 10 is a plan view in cross-section of the holding and rocking jaws, on line 10—10 of Figure 6.

Figure 11 is a quadrilateral of material which is the base form of all of the pleated rings herein described.

Figure 12 is a single fold which forms the plait, for either helical winding or annular wrapping.

Figure 13 is an end view of a dual form while being formed.

Figure 14 is an elevation of a dual fold being formed.

Figure 15 is an elevation of a completed triple fold.

Figure 16 is a representative die for forming the predetermined pleated shape.

Figure 17 is the method of reducing asbestos rings to a chemically pure base by an oxy-acetylene flame.

Figure 18 shows the method of using an insert while heat-treating the laminations having chemical impregnations.

Returning now to Figure 1, the machine frame 1 contains the stuffing-box bore thru which the shaft 2 extends. The packing gland 3 is held in place by the cap screws 4, 4 and adjusts the set of packing rings 5. The lips of the conical rings 5 used for a packing example are turned toward the source of pressure and it should be apparent that any pressure will act to collapse the lips around the rod to thereby seal off the pressure. The sealing of the wall surface by the annular wedge ring reaction is explained in my application for Letters Patent, Serial Number 580,015, filed December 10, 1931. Other factors of the sealing of pressure by this type of ring is the subject of this specification. In addition, the accordion type of ring is theoretically discussed in my application for Letters Patent, Serial Number 600,246, filed March 21, 1932.

Referring now to Figure 2, the cross-section of various ring forms which may be treated by the inching process herein described. Form *a* is that of a strip type ring, or that of a cone formed from an annular ring. Form *b* is my plait type as described in Serial Number 543,791, filed June 12, 1931, and now to be made by the inching process. Forms *c*, *d* and *e* are multiple folds or pleats, as disclosed in my Serial Number 600,246, before mentioned. Form b' is the reverse of form b showing the possibility of turning the fold to the stationary or to the movable surface.

Figure 3 indicates the application of the single plait and the multiple folds to helically wound or to annularly wrapped rings. Forms f and g are respectively the single and the dual helically wound plait. Form h is a dual plait, annularly wrapped. Form i is the triple plait, annularly wrapped.

Figure 4 is the single plait of annular wrap, a terraced lap joint being arranged by cutting the ends of the material on the bias.

Figure 5 is the dual fold of annular wrapping, a terraced lap joint being formed by cutting the ends of the material on the bias.

Figure 1:
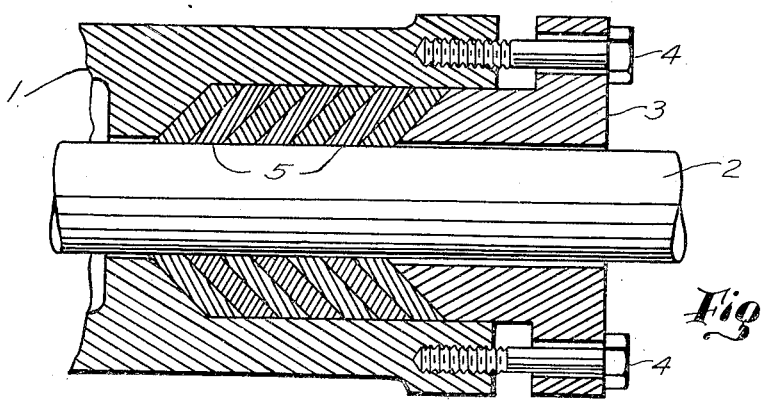
Figure 1 is a cross-section of a stuffing-box made to use conically shaped rings made according to this invention.

It should be apparent that any of the ring types of Figures 3, 4 and 5, made according to the cross-sections of Figure 2 will operate in the stuffing-box of Figure 1, as represented by the packing rings 5.

Referring now to Figure 6, the inching machine, a device for stretching one side of a piece of material, then to partially relieve the strain imposed, the result being a permanent curvature. The main frame 18 houses all of the parts which are chiefly the shuttling shaft 19 and the jaws 22 and 30. A sub-base 20 retains the stationary jaws 21 and 38 and also the guide post 28. The holding jaw 22 is integral with an arm which terminates in a bearing standard to hold a roller 24, the arm being guided by the frame at point 18a. A coiled spring 27 separates the holding jaws, as will be shown in another view.

The rocking jaw 30 is pivoted by a bearing 30a held in position by a boss of the sub-base 20. The jaw 30 is integral with an arm which extends upwardly and to which is attached the handle 32. The arm 30 houses a bearing crosshead 33 which fits the ball 34 made on the shaft 19, forming a universal joint. The coiled spring 37 holds the arm 30 against the stationary jaw 38 as will be shown in another view.

The shaft 19 slides endways in bearings formed in the frame 18. To operate the jaws 22 and 30, a pull on the handle 32 to the right as shown by the arrow will bring the cam 39 into contact with the bar 40, which being attached to the frame 18 by the screws 41, rotates the shaft part of a turn. This effect of turning the shaft 19 is repeated when the latter is returned to the extreme left hand position, the cam face 19b coming in contact with the rack bar 42, the latter being attached to the frame 18 by the screws 45, 45. The piece of material P is "inched" thru the jaws as will be explained under the details of operation.

Figure 7 is a plan view of Figure 6, a detailed description of the relative parts having been explained heretofore, and others now appearing in the figures to follow. Figure 8 is a cross-sectional view on line 8—8 of Figure 6, and exposes working parts of the holding jaws. The base 18 supports the sub-base 20, to which is affixed the stationary jaw 21. The jaws 22 and 23 are alike but reversed in position and to which are attached the sizing jaws 25 and 26 respectively to accommodate different thicknesses of the material P. The spring 27 maintains a tension on the jaws 22 and 23 so that they will separate as they rise out of the stationary jaw 21 along the angular contacts. The roller 24 has bearing provisions in the arms 22 and 23 and pushes against the shaft 19 due to the tendency of the holding jaws to rise out of the stationary jaw 21, as before mentioned.

Figure 9 is a cross-sectional view along line 9—9 of Figure 6, exposing the rocking jaws. The base 18 supports the sub-base 20 containing the bosses which restrain the pivots 30a and 31a. The rocking jaws 30 and 31 are alike but reversed in position and rest in the angular slots of the stationary jaw 38. The jaws 30 and 31 have integral arms which terminate in a handle 32. The coiled spring 37 under compression separates the jaws 30 and 31, to which are attached the sizing jaws 35 and 36 respectively to hold various thicknesses of the material P. The cross-head 33 is built around the ball 34 formed on the shaft 19 to form a universal joint.

Figure 10 is a cross-sectional view along lines 10—10 of Figure 6 and shows the relative positions of parts already described and in addition the position of the guide posts 28 and 29 which hold the sizing jaws 25 and 26 in position.

The operation of curving a piece of material P edgeways by this inching machine is as follows: The piece P is thrust thru the guide posts 28 and 29 and between the jaws 22 and 23. To open the latter the shaft 19 is moved to the right by the handle 32 until the roller 24 rises upwardly into the slot 19a, this action being caused by the spring 27 spreading the jaws 22 and 23 so that they rise along the inclined sides of the stationary jaw 21. The end of the material P is pushed into the jaws 30 and 31 as far as possible, then handle 32 is pulled to the right as far as possible causing the turning of the cam 39, thus again presenting a straight surface of the shaft 19 to the roller 24 so that when handle 32 is returned to the extreme left position, the roller 24 will be maintained in its downward position under tension and holding the piece P tightly. As the cam face 19b contacts with the rack bar 42 and rotates the shaft 19 so that the slot 19a regains its original position, the mechanism is ready for another cycle of operation as previously described. In addition, at each rocking of the jaws 30 and 31 the roller 24 rises into the slot 19a to release the material for an instant which causes enough material to slip thru the jaws 22 and 23 to relieve the tension caused by the rocking of the jaws 30 and 31.

Referring now to the inset view of the jaws 22 and 30, it should be apparent the operation of rocking the jaws 30 and 31 into the slots of the stationary jaw 38 moves the former together and pinches the piece P and at the same time pulls the upper edge of the latter into the position yz, an elongation, while the lower edge at point x being at the center of the pivots 30a and 31a is not strained or stretched. Thus the inching machine seizes a parallel section of the material P and strains it into a triangular section. A continuous series of these small triangular sections form an approximate curve. As each triangular section is formed the jaws 22 and 23 are released momentarily by the roller 24 rising into the slot 19a which advances the material in the direction of the arrow.

On the return of the jaws 30 and 31, the pinching action decreases gradually as the jaws move out of the stationary jaw 38 and release their hold on the material before the original position is reached owing to the decreased thickness of the material after the straining action has formed the triangle. The material P has thus been advanced a certain amount after each pull, the net amount being less than the maximum stretch yz. To regulate the amount of stretch yz the throw of the handle 32 may be regulated or the shape of the jaws 35 and 36 may be changed as shown by the dotted shape 35a.

This process is simulated in nature by the crawling action of the inching worm which curves its back considerably more than it advances its body. In my inching process the material is stretched considerably and then partially returned to prevent straining of the structure beyond its elastic limit assuring that the final curvature will be permanent and without a tendency to regain its original straight line position as various other sub-processes are applied to the material.

The inching process obviously is more efficient on woven and braided fibrous sheet material, such as cotton and asbestos. But there are certain fibrous materials and soft ductile metals which will respond to the method. The simplest form which can be processed is a strip of material, form a of Figure 2. This cross-section may also represent an annular ring and it should be apparent that the inching machine can be built to predetermine a conical shape by stretching the outer sections of an annular ring of material.

Form b Figure 2 is the plait or folded strip of material. Figure 11 piece 46 shows a quadrilateral of material used as the basis to obtain the lap shown in Figure 4. In Figure 12 the piece 46 is folded along the line 47—48, to one side of the center and parallel to the edges, forming an overlap which causes the edges of the laminations to lie in the same surface when formed into any conical or curved shape. After being processed in the inching machine, points 47 and 48 of Figure 12 correspond to points 6 and 7 respectively of Figure 4, and 47a and 48a respectively to 8 and 9. The stepped, or terraced lap joint, causes any fluid to pass thru the section of material bounded by the points 6—8—n, or along the surface of the latter. As the lapped joint may be made as long as required by varying the shape of the quadrilateral, leakage across the joint is eliminated as seepage thru the mentioned section is less resistant. When installed the lap jointed ring is equal to a solid wound type. It should also be apparent that the pressure space formed by the folds is continuous by the design of the terraced lap so that the ring reacts effectively to pressure at all portions.

Figure 13 is an end view of a dual fold as being formed in Figure 14. The base shape, piece 49, is the same as the quadrilateral of Figure 11, being folded to one side of the center on line 50—51, the second fold 52—53 being to one side of the center of the greater half formed by line 50—51. The third fold is made on line 54—55 in the lesser half of piece 49, to go to dotted position 56—57. Figure 14, as referred to Figure 5, a dually folded ring, points 56—57 of the former fall at 10—11 respectively of the latter; 54, 55 at 12, 13; 50, 51 at 14, 15; 52, 53 at 16, 17. The ends of the quadrilateral 49 when multiply folded form a terraced lap, the respective thicknesses on one side of the lap fitting into corresponding thicknesses on the adjoining face. Thus when compressed into a mould the ring is as thick at the lapped joint as at any other portion thereby insuring a uniform density around the contour. The perspective of form h, Figure 3, showing the ring spread apart and the corresponding cross-section d of Figure 2, complete the description of the dual fold. As in the case of Figure 4, the ring of Figure 5 provides continuous annular pressure spaces and leakage across the joint is prevented by the length of the lap which makes less resistance thru the jointed section.

Figure 15 is a triple fold made from the quadrilateral base 46 of Figure 11, this ring when spread apart appearing at i, Figure 3, and having a cross-section e of Figure 2.

Figure 16 is the cross-section of a die in which rings are formed to any desired shape, the mould 58 and the punch 59 forming the conical ring shape 5 for use in the stuffing-box of Figure 1. Altho a cone is given as an example it should be apparent that after correctly processing the pleats in the inching machine that any other form such as V-rings, frusto-conical shapes and the like may be made.

The method of using laminations parallel to the ring faces to build a packing ring has heretofore been accomplished by using a series of helical winds or an assembly of annular rings. My improvement consists in using laminations permanently joined together by folds, but the laminations not adhering. The result is a hinge-like effect, of sturdy construction and very flexible, similar to the familiar corrugated expansion joint or the accordion pleat which is used in some wind instruments.

The use of this independently acting series of laminations makes possible the innovation of several processes and forms which are needed in industry. For example, the packing of high temperature steam and gases is best accomplished with pure asbestos made into thin laminations. Processes for using asbestos at present have several faults. Strip wound asbestos rings must be cut for installation, or the machine must be dismantled if they are to be installed uncut to prevent leakage across the cut. Any leakage of a high temperature gas invariably cuts lanes thru a packing ring in a short time and will cause the asbestos to "snow". This is corrected by my accordion ring, the terraced lap joint causing a gradual seepage to occur thru the lap, a reaction to the pressure. Any degree of a lap joint which may be cut in a ring is not the equivalent of the long terraced lap, as indicated by the investigation in my Serial Number 600,246, filed March 21, 1932, Saturation by synthesis, Figure 23.

When first installed all asbestos rings as now made shrink about ten percent of their depth in the box, if exposed to high temperatures in gas or steam. This is very detrimental to continuous operation as at the first opportunity the stuffing-box must be opened and the loss of depth made up with more rings. My investigations show that about three percent of the loss in depth is due to the charring of the cotton which is necessary to bind the asbestos fibers together during fabrication. Seven percent is commonly supposed to be due to the evaporation of moisture which has been absorbed due to the humidity of the atmosphere. This however, is not the fact.

Chemically pure asbestos may be obtained in almost any form but the first cost is prohibitive and it is too soft and flexible to be suitable for dependable moulding operations. The ninety percent, or "high grade" commercial product is reasonable in cost, is subject to the ten percent loss mentioned, and has sufficient stability to be moulded into any shape as required by this inching process. I have found that the moisture loss is due to the dehydration of impurities combined with the asbestos, such being serpentine rock and several hydrous silicates. The latter desiccate at various temperatures leaving a base of magnesium silicate which is infusible.

Therefore to prepare packing rings for high temperature gases and steam I heat them to a red heat after being formed to any of the shapes and forms shown in Figure 3, and hold the temperature for about one hour. When cooled they may be found to have shrunk and are very soft and flexible. The residue from the reductions may be removed by shaking the rings vigorously or subjecting them to a stream of compressed air. After being recompressed in moulds they may be placed in service without any appreciable shrinkage occurring. It should be obvious that any strip-wound or annular ring types made of asbestos, whether or not cemented together, would not stand the dehydration treatment as they would fall apart and not be suitable for shipment. The laminations in my pleated types will stand any degree of heat before or after installation and may be removed from the stuffing-box many times without harm to the shape and structure.

Still another need for chemically pure asbestos is found in moderate temperatures for such uses as natural gas and compressed air packings. Since it has been found that any cements containing synthetic or rubber will harden in these services, I have developed a treatment suitable. In Figure 17 is shown the method for reducing the hydrates of magnesium and other impurities at the points of contact with the movable surface, such as the triple fold ring 60 having conically shaped laminations. For example, an oxy-acetylene torch 61 capable of developing several thousand degrees temperature has the flame 62 directed on the folds R. The intense heat quickly brings the asbestos to incandescence, the impurities are dehydrated on the portions thus heated leaving the folds of pure magnesium silicate. A slow passage of the flame 62 around the contact surfaces is all that is necessary, the rings are recompressed and are ready for service. The laminations are not cemented and are therefore immune to the hardening effects caused by binders. This process preserves the elasticity of the original cloth due to its impurities yet provides a soft contact surface.

Still another use for the process of Figure 17 is found in making rings of extreme flexibility. Asbestos cloth having fine wire insertion is used to form the ring 60. The flame 62 is adjusted to have excess oxygen and its application to the ridges R, in addition to dehydrating the impurities will oxidize the inserted wires which are in the folds and dissipate them as oxides. Mechanical shaking or exposure to a stream of compressed air will remove the products of reduction. Thus a ring is formed having wire inserted folds at the stationary surface of contact for example, and wireless chemically pure magnesium silicate folds at the movable surface. This ring is very elastic when subjected to pressure, responding quickly to pressure changes and to misalignment, at the same time creating a moderate friction due to the softness of the contacting points.

A very important problem which the multiple folded ring solves is the holding of all light oils, such as gasoline of any gravity, especially in combination with free sulphur and sulphurous gases which occur in gasoline production and refining processes. There are several preparations consisting of resinous compounds which are not affected by the liquids and chemicals mentioned. These preparations are hard-drying, therefore when used to impregnate braided square shapes or when made up in rings of any thickness are very stiff and unyielding and will score the rod or shaft. My method of utilizing such chemical impregnations is to form the ring and then spread it apart as i, Figure 3, then paint or dip it in the preparation. After drying the ring is recompressed, no two laminations being cemented together, yet are attached by the folds. Thus a great number of chemicals may be used on cotton, asbestos or other fibrous materials after being made into the pleated form, the recompressed rings having parallel laminations chemically inert yet having the advantage of flexibility, the terraced lap joint and any number of required shapes.

There is another treatment which pleated rings sometimes need. Many excellent gums, natural and synthetic, are too plastic for impregnation in the ordinary manner, or for application by brushing. Figure 18 shows a plait ring 63 lying flat after being formed. The gum is spread on the surfaces then an insert 64 which is non-adhesive to the gum is placed between the laminations. The assembly is pressed together by a clamp or weighted and placed in a heat-treating furnace. As such gums assume different degrees of hardness according to the temperature applied, this process makes possible the variation of hardness within the laminations. The insert 64 is removed after the treatment, the rings recompressed to obtain correct dimensions and is ready for service. It should be obvious that any single plait, or pleated rings may be so treated, while any single strip or annular ring type would lack the elasticity due to pressure which is caused by the folds.

The inching process is also adaptable for making rings of tapered cross-section, such being needed in my constant friction packing sets which are the subject of a succeeding application for Letters Patent. In Figure 2, for example, a small flexible insert ba, ea or b'x may be placed in the neck of a fold. In Figure 6 the insert is shown at Px, conforming to the curvature given the material P. As an insert will make a wedge-shaped base instead of the rectangular cross-section as shown in Figures 8 and 9 for P, the jaws 25a and 26a, 35a and 36a are tapered to accommodate the enlargement on one edge of the material. The effect of the insert on the ring shape is shown in Figure 4 by the enlarged outer thickness, the dotted contour 7, 9a, m, 8b, 8a and 6. In Figure 3, form f, a helically wound plait has an enlarged thickness at the outer edge as shown by the dotted contour fa—fb. It should be obvious that the outer or inner thickness of any of the pleated forms of Figure 2 may be so regulated by choosing the number and thickness of the inserts and that the inching machine will consistently predetermine the curvature of the combinations. It is also possible to produce a small degree of taper in a piece of material by inching it thru the tapered jaws as shown, if it is of sufficient porosity to take the change of shape.

The pleated form of helically wound or annularly wrapped packing ring makes possible other useful processes. Leather is a very satisfactory material for cold and warm water, cotton-seed oil and similar conditions. Its use in conical form however, has several drawbacks owing to the thickness necessary. When used in thin laminations such as is possible in forms h and i, Figure 3 for example, it becomes very efficient, the porous walls passing sufficient seepage to prevent the swelling which is encountered in thicker rings due to the saturation by the fluid pressure, in turn producing a ring of moderate friction.

To form a leather ring less reactive to pressure than those of forms h and i, Figure 3, the respective spaces s and tu are coated with water or oil-proofing cement such as celluloid dissolved in acetone, then repressed in the mould and allowed to dry under pressure of the press. The result is a solid face ring exposed to the stationary surface, for example, and open laminations in contact with the movable.

There is no substitute for cotton as a fiber for use in alkaline waters, ammonia gas, carbon dioxide gas and the like. When used in braided form or in thick rings is swells excessively due to absorption of water, or oil used as rod lubricants. When used in sheet form it is formed only under difficulty and will not retain the pleated shape unless the laminations are bound together in some manner. The pleated rings, forms f, g, h and i, Figure 3, provide a novel means to hold the cotton in shape and at the same time control the swelling due to the increase of volume from saturation of the fibers. The spaces r, s and tu are coated with a vulcanizing cement and a thin layer of rubber inserted therein. When vulcanized the rings have one united edge and the opposing edge is laminated, the pressure spaces open. One side of each lamination is made impervious by the face of rubber and its opposing face is cotton fabric capable of absorbing liquids or gases, the amount of saturation being controlled by the pressure space. This arrangement counteracts the severe expansion and contraction to which cotton rings are subject.

The annularly wrapped pleated form with the terraced lap joint is very desirable for some severe conditions such as water or oil containing sand, pipe mill scale and the like. It is not then desirable to have the pressure spaces open to accommodate the foreign matter but the long terraced lap is beneficial to permit the ring to move annularly to accommodate itself to the conditions without allowing leakage across the joint. For such rings the spaces between all of the folds are treated with a binder which will be permanent in the condition, yet when compressed in the mould some form of power is used to prevent closing of the lapped joint. In other cases it may be desirable to also bind the terraced lap, thus making a solid ring.

In still other methods of using silk, flannel, pure wool and similar soft fabrics the pleating process is not possible unless the fabric is first treated with a stiffener. Such an impregnation must necessarily have a very weak binding power and must be dissolvable in the condition after the rings are installed. The fabrics so treated may be termed, temporarily bound.

The majority of rings made by the inching process are not cemented in any manner and for shipping purposes a weak adhesive such as paste is used to temporarily close the lapped joint. The operator may then open the rings when installing them.

The appended claims pertain to the process of fabrication and nothing herein is claimed for the inching machine nor the articles of manufacture, these being the subject of succeeding applications for Letters Patent.

The process of determining the curvature of pleats and multiple folds as herein described has an unlimited application in the manufacture of all curved shapes and such applications as are included in the appended claims are construed to be within the spirit of this invention.

I claim:

1. The method of lengthening one side of a thin strip of flexible fabric material having parallel sides consisting of clamping the strip to hold a section thereof stationary engaging a section of said strip adjacent the stationary portion and stretching one side thereof to deform said section into a triangular portion of predetermined area then advancing the strip and repeating this operation.

2. The method of determining the curvature of a thin strip of flexible absorbent material consisting of holding the uncurved strip rigidly against movement, stretching a series of contiguous rectangular sections across said strip inequally along one side thereof and permanently deforming said sections into triangular sections of predetermined area.

3. The method of lengthening one side of a plait of thin flexible fabric material to form a circular packing member, consisting of stretching a series of contiguous parallel sided sections of said plait most strongly along one edge thereof and deforming said sections into triangular sections of predetermined area.

4. The method of determining the curvature of a plait of thin flexible material consisting of stretching most strongly along one edge, a series of contiguous parallel sections across said plait and permanently deforming them into triangular sections of predetermined area.

5. The method of lengthening one side of a multiple pleated member of thin flexible fabric material consisting of gripping a transverse section thereof and stretching one side of each of said sections and continuing this operation on successive sections and thereby transforming rectangular areas into triangular sections of predetermined areas.

6. The method of forming a packing from a quadrilateral of thin flexible material consisting of folding said quadrilateral into a plait of contacting laminations having on each end a triangular recess, stretching one margin of said plait, then forming said plait into an annulus the angular projection of one end residing in the recess of the opposite end, then by pressure forcing said annulus into the matrix of a mould to cause the laminations to lie in parallel layers.

7. The method of forming a quadrilateral of thin material into a multiple pleated member of parallel contacting laminations having on each end a terrace of triangular recesses, comprising folding said quadrilateral longitudinally, stretching one side to predetermine the curvature of said member, then forming said member into an annulus, the annular projection of one end residing in the recesses of the opposing end, then by pressure forcing said member into the matrix of a mould to cause the laminations of said member to lie in parallel layers.

8. The method of forming packing comprising folding a quadrilateral of thin material into a plait, stretching one side of said plait a predetermined amount to cause said plait to lie in a circle, then winding said plait in helical form, placing said helical strip into a matrix under pressure to cause the layers thereof to lie against each other in parallel relation, the edges of said plait lying in cylindrical surfaces.

9. The method of forming packing from a quadrilateral of thin flexible material comprising folding said quadrilateral into a plaited member having a plurality of similar laminations with overlapping folds, stretching one edge of said strip to predetermine the curvature thereof, coating the adjoining laminations of one side of said member with an adhesive moisture-proof cement, and then compressing the said member longitudinally in a mould.

10. The method of forming a ring of packing material comprising folding a thin sheet of fabric to form a laminated strip, stretching one side of said strip to cause the same to assume a helical form, coating the adjoining laminations of one side only of said folded member with vulcanizing material, pressing said strip within a mould and subjecting said mould to heat.

11. The method of forming packing from a quadrilateral of thin flexible material comprising folding said quadrilateral into a longitudinal strip, coating the contiguous surfaces of said strip on one side thereof with a temporary binder, stretching one edge of said strip to curve the same and compressing the said strip longitudinally into a mould of the desired shape.

HARLEY T. WHEELER.